(12) United States Patent
Bando

(10) Patent No.: US 8,393,256 B2
(45) Date of Patent: Mar. 12, 2013

(54) GLASS PLATE CUTTING METHOD AND GLASS PLATE CUTTING MACHINE

(75) Inventor: Kazuaki Bando, Tokushima (JP)

(73) Assignee: Bando Kiko Co., Ltd., Tokushima (JP)

( * ) Notice: Subject to any disclaimer, the term of this patent is extended or adjusted under 35 U.S.C. 154(b) by 612 days.

(21) Appl. No.: 12/298,374

(22) PCT Filed: Jun. 21, 2006

(86) PCT No.: PCT/JP2006/312453
§ 371 (c)(1),
(2), (4) Date: Oct. 24, 2008

(87) PCT Pub. No.: WO2007/125610
PCT Pub. Date: Nov. 8, 2007

(65) Prior Publication Data
US 2009/0120988 A1   May 14, 2009

(30) Foreign Application Priority Data
Apr. 28, 2006 (JP) .................. 2006-126995

(51) Int. Cl.
*B26D 3/08* (2006.01)
(52) U.S. Cl. .................. 83/879; 83/639.1; 225/3; 225/4
(58) Field of Classification Search ...... 83/13, 879–881, 83/886, 887, 98, 639.1–639.3, 639.5, 639.7; 225/1–5, 93, 94, 95, 96, 97
See application file for complete search history.

(56) References Cited

U.S. PATENT DOCUMENTS

| | | | | | |
|---|---|---|---|---|---|
| 4,392,404 | A | * | 7/1983 | Schwarzenberg et al. | 83/886 |
| 5,381,713 | A | * | 1/1995 | Smith | 83/881 |
| 6,105,483 | A | * | 8/2000 | Takeda | 83/881 |
| 2002/0023528 | A1 | * | 2/2002 | Shimotoyodome et al. | 83/880 |
| 2002/0112578 | A1 | * | 8/2002 | Duggins et al. | 83/13 |
| 2006/0163306 | A1 | * | 7/2006 | John et al. | 225/4 |

FOREIGN PATENT DOCUMENTS

| | | |
|---|---|---|
| JP | 2003-2675 | 1/2003 |
| JP | 2003-2675 A | 1/2003 |
| JP | 2004-224592 | 8/2004 |
| JP | 2004-224592 A | 8/2004 |
| JP | 2004-292312 | 10/2004 |
| JP | 2004-292312 A | 10/2004 |

OTHER PUBLICATIONS

International Search Report for PCT/JP2006/312453, mailed Jul. 25, 2006.

* cited by examiner

*Primary Examiner* — Phong Nguyen
(74) *Attorney, Agent, or Firm* — Nixon & Vanderhye P.C.

(57) ABSTRACT

A glass plate cutting machine 1 includes a cutter wheel 4 for forming a cut line 3 on a glass plate 2; a moving means 5 for moving the cutter wheel 4 along a cut line 3*a* which has been preset and is to be formed on the glass plate 2; a resiliently pressing device 6 for resiliently pressing the cutter wheel 4 against the glass plate 2; and a control unit 7 for controlling the resiliently pressing device 6 so as to alternately change over the intensity of a resiliently pressing force of that cutter wheel 4 with respect to the glass plate 2 in the movement of the cutter wheel 4 by the moving means 5.

4 Claims, 5 Drawing Sheets

GLASS PLATE CUTTING METHOD AND GLASS PLATE CUTTING MACHINE

This application is the U.S. national phase of International Application No. PCT/JP2006/312453, filed 21 Jun. 2006, which designated the U.S. and claims priority to Japanese Application No. 2006-126995 filed 28 Apr. 2006, the entire contents of each of which are hereby incorporated by reference.

TECHNICAL FIELD

The present invention relates to a glass plate cutting method and a glass plate cutting machine for cutting a crystallized glass plate or the like as a window glass plate for an automobile, a glass plate for constriction such as a conventional home, or a glass plate for a kitchen.

BACKGROUND ART

[Patent Document 1] JP-A-2002-274875

As shown in patent document 1, for example, a glass plate cutting machine is so structured as to move a cutter wheel as a cutter blade with respect to a glass plate by a moving device and to press the cutter wheel against the glass plate by an air cylinder unit.

DISCLOSURE OF THE INVENTION

Problems that the Invention is to Solve

In general, a crystallized glass plate is used as a glass plate for a kitchen (IH glass), but this crystallized glass is hard in terms of its material, and even if a straight line portion is cut (a cut line is formed) by an ordinary glass cutting method, the propagation of fissure is difficult to take place sufficiently and finely. In addition, a window glass for an automobile and a glass plate for a kitchen (IH glass) have corner portions having round (circular arc-like) shapes. When cutting and producing a glass plate having such round corners, fissure is not formed sufficiently, finely, and reliably at the cut line portions of round-shaped portions of the corners, and its propagation does not take place sufficiently. The greater the glass thickness, such as 5 mm and 6 mm, and the smaller the radius of the curvature, the more sufficient fissure formation is difficult. As a measure to cope with this, a conventional cutting machine, when reaching a corner portion from a straight line portion, strengthens the pressing force for pressing the cutter against the glass plate and drops the moving speed of the cutter to an extremely low level to effect cutting. Despite this fact, sufficiently deep and fine fissure is not formed at the cut line of the corner portion, and when the glass plate is bend-broken, its cut surface is formed as a jaggy chipped surface, and it is difficult to obtain a high-quality fine surface.

The present invention has been devised in view of the above-described aspects, and its object is to provide a glass plate cutting method and a glass plate cutting machine which are capable of forming on a glass plate a cut line where fissure formation has propagated deeply and finely at not only a straight line portion but a round shape of the corner even in a crystallized glass plate or the like.

Means for Solving the Problems

A glass plate cutting method in accordance with the invention comprises the steps of: moving a cutter blade along a cut line which has been preset and is to be formed on the glass plate; and resiliently pressing the cutter blade against the glass plate while alternately changing over the intensity of a resiliently pressing force of the cutter blade with respect to the glass plate during the movement, to thereby form the out line on the glass plate.

According to the glass plate cutting method in accordance with the invention, since, in particular, the intensity of the resiliently pressing force of the cutter blade with respect to the glass plate is alternately changed over, it is possible to form on the glass plate a cut line where fissure formation has propagated more deeply and finely.

In a preferred example of the glass plate cutting method in accordance with the invention, the intensity of the resiliently pressing force of the cutter blade with respect to the glass plate in the movement of the cutter blade is alternately changed over at a fixed time interval.

In a preferred example of the glass plate cutting method in accordance with the invention, the cutter blade is resiliently pressed against the glass plate by air pressure.

In a preferred example of the glass plate cutting method in accordance with the invention, the intensity of the resiliently pressing force of the cutter blade with respect to the glass plate is changed over at a time interval of from 30 ms to 70 ms.

In the glass plate cutting method in accordance with the invention, the moving velocity at the time when the cutter blade is moved along a round portion of such as a corner portion, a pointed portion, or the like while alternately changing over the intensity of the resiliently pressing force of the cutter blade with respect to the glass plate at a fixed time interval is set to be lower than the moving velocity at the time when the cutter blade is moved along a straight line portion. In addition, in an example of the glass plate cutting method in accordance with the invention, the moving velocity for moving the cutter blade along a round portion of such as a corner portion, a pointed portion, or the like may be subjected to velocity adjustment in correspondence with the curvature of that round portion.

A glass plate cutting machine in accordance with the invention comprises: a cutter blade for forming a cut line on the glass plate; moving means for moving the cutter blade along the cut line which has been preset and is to be formed on the glass plate; a resiliently pressing device for resiliently pressing the cutter blade against the glass plate; and a control unit for controlling the resiliently pressing device so as to alternately change over the intensity of a resiliently pressing force of the cutter blade with respect to the glass plate in the movement of the cutter blade by the moving means.

According to the glass plate cutting machine in accordance with the invention, in particular, since a control unit is provided for controlling the resiliently pressing device so as to alternately change over the intensity of the resiliently pressing force of the cutter blade with respect to the glass plate in the movement of the cutter blade by the moving means, it is possible to form on the glass plate a cut line where fissure formation has propagated deeply and finely.

In a preferred example of the glass plate cutting machine in accordance with the invention, the control unit is adapted to control the resiliently pressing device so as to alternately change over the intensity of the resiliently pressing force of the cutter blade with respect to the glass plate at a fixed time interval in the movement of the cutter blade.

In a preferred example of the glass plate cutting machine in accordance with the invention, the resiliently pressing device is adapted to resiliently press the cutter blade against the glass plate by air pressure.

In a preferred example of the glass plate cutting machine in accordance with the invention, the control unit is adapted to control the resiliently pressing device so as to alternately change over the intensity of the resiliently pressing force of the cutter blade with respect to the glass plate at a time interval of from 30 ms to 70 ms.

In an example of the glass plate cutting machine in accordance with the invention, the control unit may be adapted to control the resiliently pressing device such that the time interval for alternately changing over the intensity of the resiliently pressing force of the cutter blade with respect to the glass plate at a round portion such as a corner portion, a pointed portion, or the like becomes shorter than the time interval for alternately changing over the intensity of the resiliently pressing force of the cutter blade with respect to the glass plate at a straight line portion.

In an example of the glass plate cutting machine in accordance with the invention, the control unit controls the resiliently pressing device so as to alternately change over the intensity of the resiliently pressing force of the cutter blade with respect to the glass plate at a fixed time interval. Additionally, the moving velocity at the time when the cutter blade is moved along a round portion of such as a corner portion pr a pointed portion by the moving means is set to be lower than the moving velocity at the time when the cutter blade is moved along a straight line portion by the moving means. In addition, in an example of the glass plate cutting machine in accordance with the invention, the moving velocity for moving by the moving means the cutter blade along a round portion of a preset cut line to be formed may be subjected to velocity adjustment in correspondence with the curvature of that round portion.

Advantages of the Invention

According to the invention, it is possible to provide a glass plate cutting method and a glass plate cutting machine which are capable of forming a cut line where fissure formation has propagated sufficiently deeply and finely at not only a straight line portion but a round shape of a corner portion in a glass plate whose radius of curvature of a pointed portion or a corner portion is small as in the shape of a window glass for an automobile, or in such as a glass plate formed of a crystallized glass as in a kitchen glass (IH glass) and having corners of round shapes.

Next, a more detailed description will be given of an embodiment of the invention on the basis of the embodiment illustrated in the drawings. It should be noted that the invention is not limited to the embodiment.

BEST MODE FOR CARRYING OUT THE INVENTION

Figure 1:
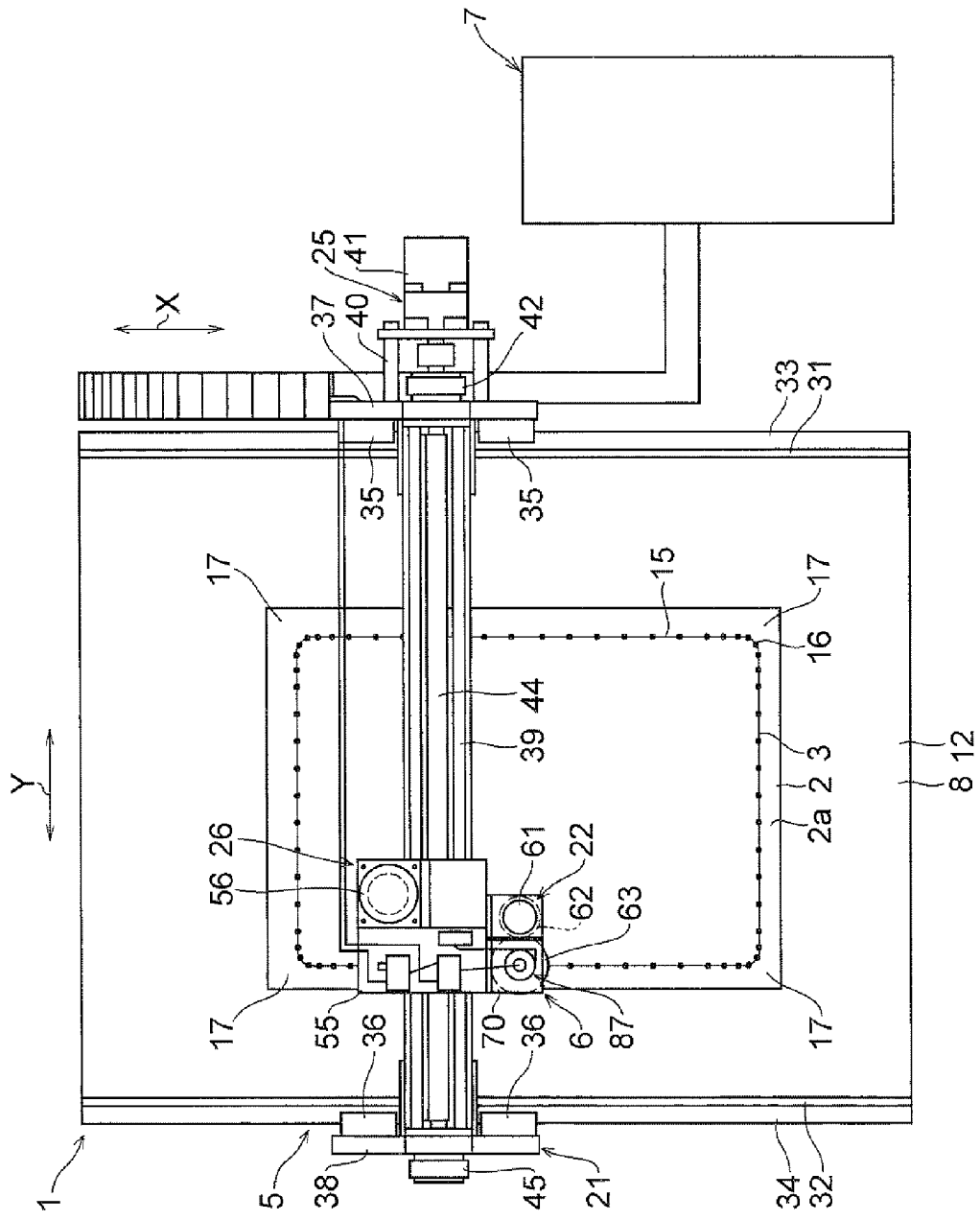
FIG. 1 is an explanatory plan view of an embodiment of the invention.
Figure 2:
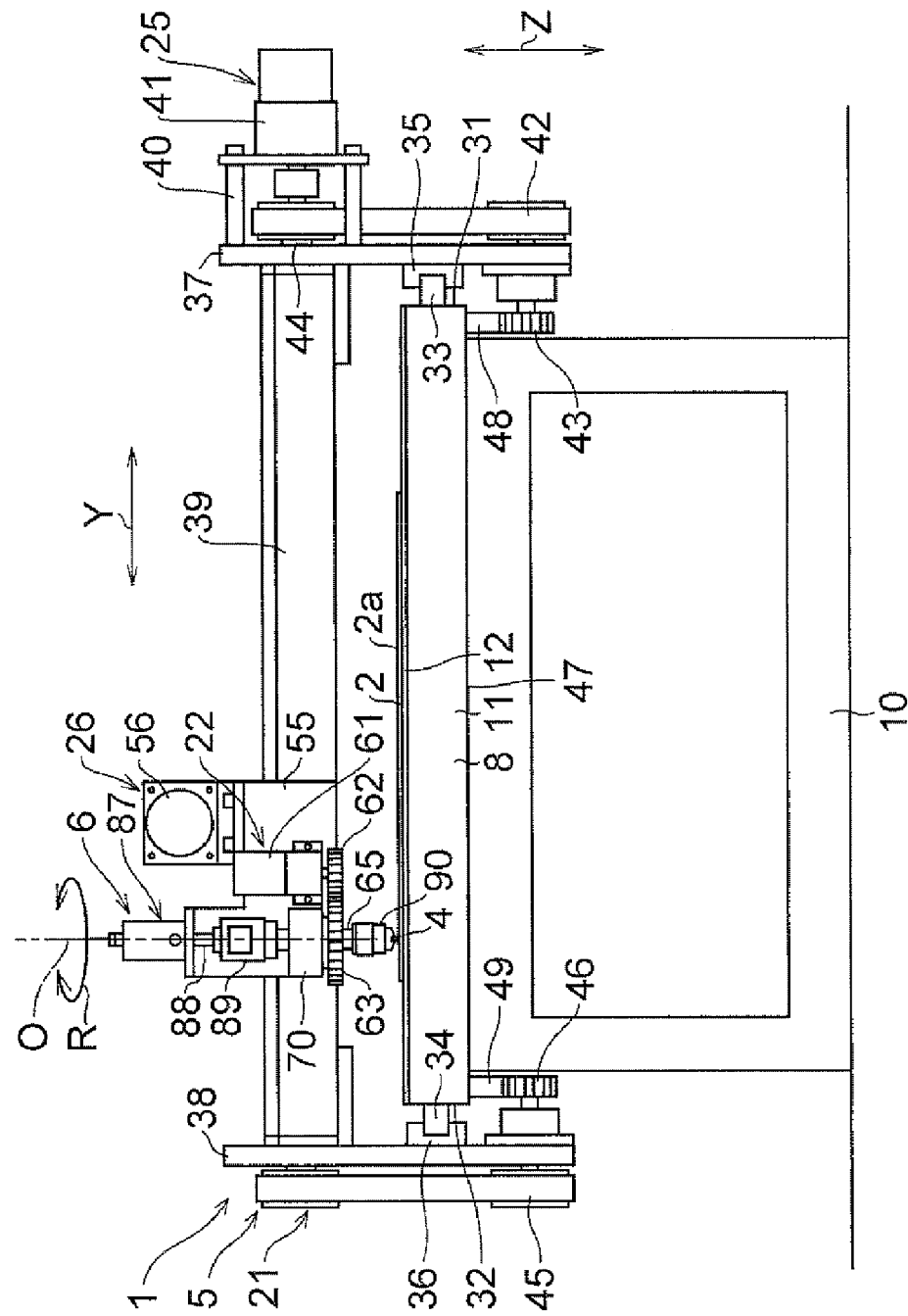
FIG. 2 is an explanatory front elevational view of the embodiment shown in FIG. 1.
Figure 3:
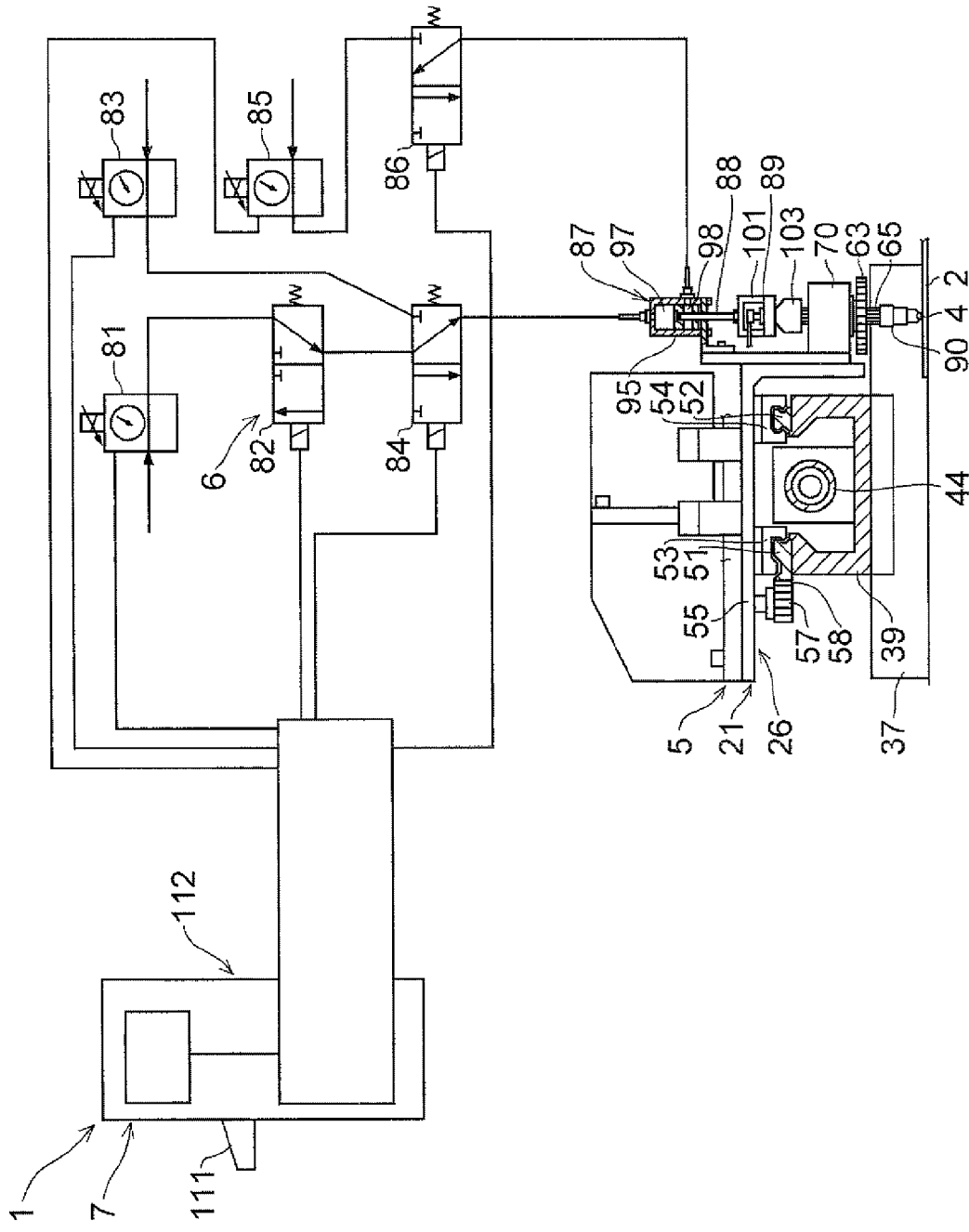
FIG. 3 is an explanatory conceptual diagram of the embodiment shown in FIG. 1.
Figure 4:
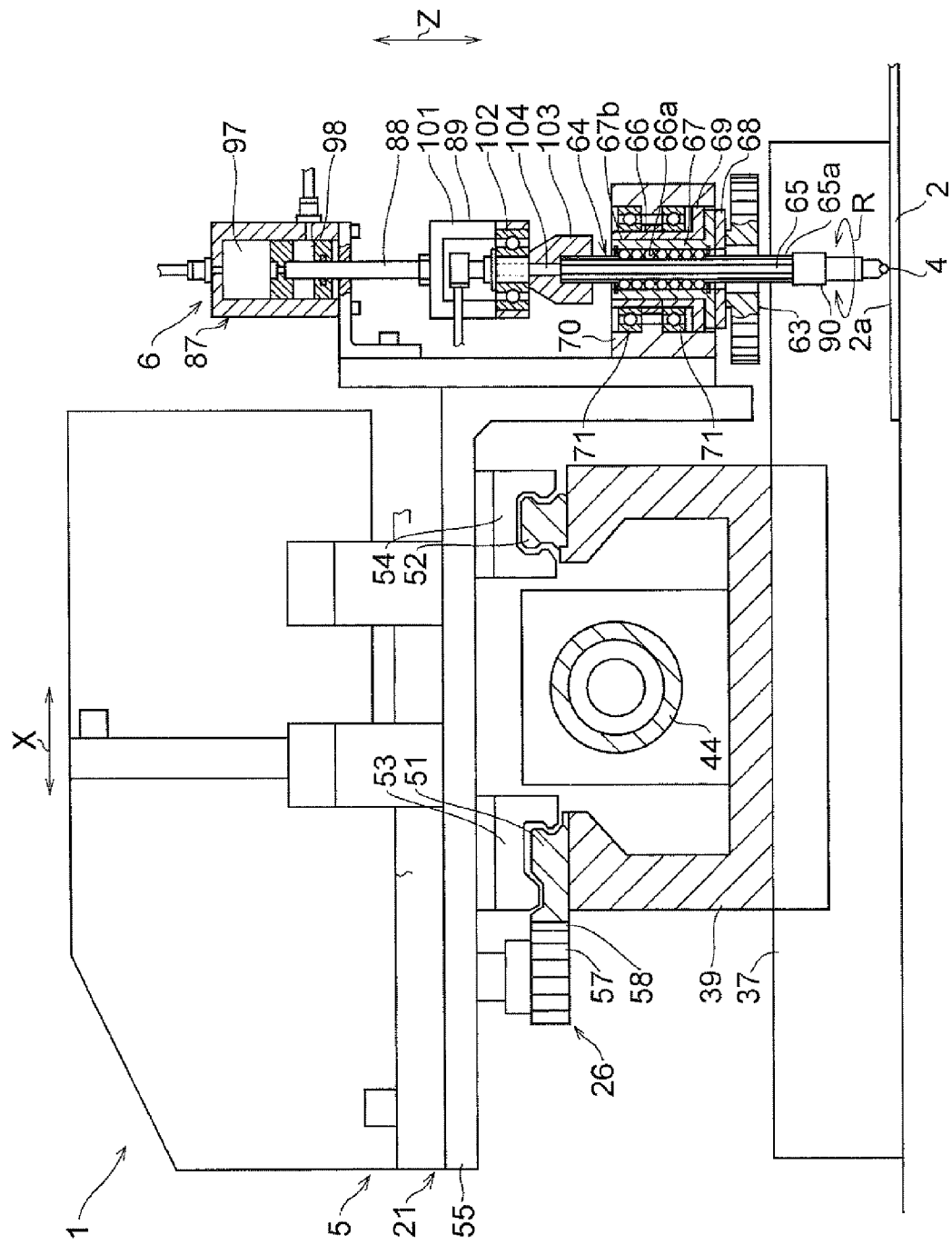
FIG. 4 is a partially enlarged explanatory view of the embodiment shown in FIG. 1; and The parts (a) and (b) of FIG. 5 are explanatory diagrams concerning mainly a cutter wheel of the embodiment shown in FIG. 1.
Figure 5:
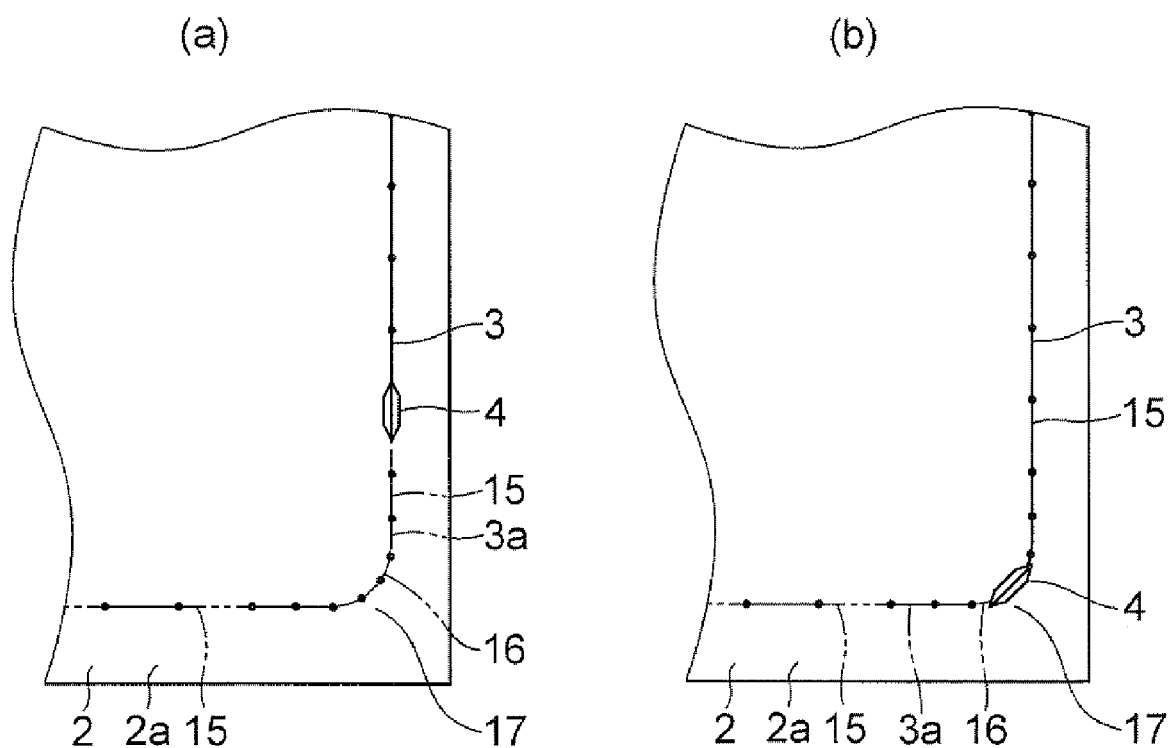

In FIGS. 1 to 4, a glass plate cutting machine 1 in accordance with this embodiment is comprised of a cutter wheel 4 serving as a cutter blade for forming a cut line 3 on a glass plate 2, i.e., a cutter tip which rolls on the glass plate 2; a moving means 5 for moving the cutter wheel 4 along a cut line 3a which is shown in the parts (a) and (b) of FIG. 5, has been preset, and is to be formed on the glass plate 2; a resiliently pressing device 6 for resiliently pressing the cutter wheel 4 against the glass plate 2; a control unit 7 for controlling the resiliently pressing device 6 so as to alternately change over the intensity of a resiliently pressing force of that cutter wheel 4 with respect to the glass plate 2 in the movement of the cutter wheel 4 by the moving means 5; and a supporting table 8 for supporting the glass plate 2 where the cut line 3 is to be formed.

The supporting table 8 includes a supporting table body 11 installed on a base 10 and a damage prevention sheet 12 stretched on an upper surface of the supporting table body 11, and is adapted to support the glass plate 2 as the glass plate 2 is placed on the damage prevention sheet 12.

The moving means 5 includes an X-Y direction moving device 21 for moving the cutter wheel 4 in an X-Y coordinate plane with respect to the glass plate 2 placed on the supporting table 8, as well as a rotating device (angle controlling device) 22 for rotating the cutter wheel 4 in an R direction relative to the glass plate 2.

The X-Y direction moving device 21 includes an X-direction moving unit 25 for moving the cutter wheel 4 in an X direction with respect to the glass plate 2, as well as a Y-direction moving unit 26 for moving the cutter wheel 4 in a Y direction perpendicular to the X direction with respect to the glass plate 2.

The X direction moving unit 25 includes guide rails 33 and 34 which are juxtaposed in parallel along the X direction on both sides of the supporting table body 11; X-direction movable bodies 37 and 38 respectively having slide blocks 35 and 36 which are respectively fitted to the guide rails 33 and 34 so as to be movable in the X direction; a Y-direction extending movable frame 39 disposed above the supporting table 8 and installed on the X-direction movable bodies 37 and 38; an X-axis servo motor 41 secured to the X-direction movable body 37 by means of stays and the like 40; a pinion 43 which is rotatably supported by the X-direction movable body 37 and is connected to the X-axis servo motor 41 by means of a pulley, belt, and the like 42; a Y-direction extending rotating shaft 44 which is rotatably supported by the X-direction movable bodies 37 and 38 in such a manner as to extend in the Y direction and is connected to at its one end to the X-axis servo motor 41; a pinion 46 which is rotatably supported by the X-direction movable body 38 and is connected to the other end of the rotating shaft 44 by means of a pulley, belt, and the like 45; and X-direction extending toothed racks 48 and 49 which are respectively meshed with the pinions 43 and 46 and are respectively secured to a lower surface 47 of the supporting table body 111 at opposite edge portions 31 and 32 of the supporting table body 11. The cutter wheel 4 is mounted on the movable frame 39 by means of the Y-direction moving unit 26 and the like A cutter head having the cutter wheel 4, the resiliently pressing device 6, the rotating device 22, and the like is arranged to move on the movable frame 39 in the Y direction.

The X direction moving unit 25 is adapted to rotate the pinion 43 by means of the pulley, the belt, and the like 42 by the operation of the X-axis servo motor 41, rotate the pinion 46 by means of the rotating shaft 44 and the pulley, the belt, and the like 45, and move the X-direction movable bodies 37 and 38 and the movable frame 39 in the X direction along the toothed racks 48 and 49 by the rotation of the pinions 43 and 46, to thereby move the cutter wheel 4 in the X direction. In the movement of the movable frame 39 in the X direction, the X-direction movable bodies 37 and 38 are guided in the X direction by the guide rails 33 and 34. The pinions 43 and 46 are coupled to each other by the line shaft 44, and are rotated in mechanical synchronism with each other by the operation of the X-axis servo motor 41. Such an X-direction moving unit 25 is adapted to linearly reciprocate the cutter wheel 4 in the X direction.

The Y direction moving unit 26 includes a pair of guide rails 51 and 52 secured to the movable frame 39 in such a manner as to extend in the Y direction; a Y-direction movable body 55 having slide blocks 53 and 54 which are fitted to the guide rail 51 so as to be movable in the Y direction; a Y-axis servo motor 56 secured to the Y-direction movable body; a pinion 57 mounted on the Y-axis servo motor 56; and a toothed rack 58 secured to the movable frame 39 by means of the guide rail 51 in such a manner as to extend in the Y direction. The cutter head is mounted on the Y-direction movable body 55 shown substantially in an L-shape in FIG. 4, and this cutter head has the resiliently pressing device 6, the rotating device (angle controlling device) 22, and the cutter wheel 4, as described above.

The Y direction moving unit 26 is adapted to rotate the pinion 57 by the operation of the Y-axis servo motor 56, and move the Y-direction movable body 55 in the Y direction along the toothed rack 58 by this rotation, to thereby move the cutter wheel 4 in the Y direction. The Y-direction movable body 55 is guided in the Y direction by the guide rails 51 and 52 when the pinion 57 is rotated. Such a Y-direction moving unit 26 is adapted to linearly reciprocate the cutter wheel 4 in the Y direction.

The rotating device (angle controlling device) 22 includes an angle control motor 61 secured to the Y-direction movable body 55; a rotary gear 62 which is mounted on the angle control motor 61 and is rotated by the operation of the angle control motor 61; a rotary gear 63 meshing with the gear 62; and a rotary tubular body 66 to which the rotary gear 63 is secured, and which is coupled at its inner peripheral surface 66a to the cutter wheel 4 by means of a ball spline mechanism 64, a rod 65 extending in a Z direction perpendicular to the X and Y directions, and the like.

The rotary tubular body 66 in this embodiment includes a tubular body 67 to a lower end of which a flange is integrally formed, and which defines at its inner peripheral surface 66a a though hole in which the ball spline mechanism 64 and the rod 65 are disposed; an annular plate 68 of an annular shape having an annular upper surface secured to the flange portion of the tubular body 67 and an annular lower surface to which the rotary gear 63 is secured; and a flanged bush 69 which is mounted on an outer peripheral surface 67b of the tubular body 67. Such a rotary tubular body 66 is rotatably supported via a bearing 71 by a support 70 secured to the Y direction movable body 55. It should be noted that the tubular body 67 is supported by that support 70 so as not to come off the support 70.

The ball spline mechanism 64 allows the vertical movement of the rod 65 itself in the Z direction such that the rotation of the rotary tubular body 66 about an axis O of the rod 65 in the R direction is transmitted to the rod 65 and the rod 65 becomes liftable.

The rotating device (angle controlling device) 22 is adapted to rotate the tubular body 67 in the R direction by means of the rotary gears 62 and 63 by the operation of the angle control motor 61, and transmits this rotation to the cutter wheel 4 by means of the ball spine mechanism 64, the rod 65, and the like, to thereby providing angular control of the cutter wheel 4 in the R direction. A blade edge of the cutter wheel 4 is subjected to angular control by the rotating device (angle controlling device) 22, and is thereby oriented in a cut-line forming direction.

The resiliently pressing device 6 includes an electro-pneumatic regulator 81 and a valve unit 82 for lowering the cutter wheel 4; an electro-pneumatic regulator 83 and a valve unit 84 for lowering the cutter wheel 4 with air pressure higher than the air pressure for lowering the cutter wheel 4 by the electro-pneumatic regulator 81 and the valve unit 82; an electro-pneumatic regulator 85 and a valve unit 86 for raising the cutter wheel 4; an air cylinder unit 87 connected to the valve units 82, 84, and 86 and secured to the Y direction movable body 55; and the rod 65 which is rotatably mounted at its upper end to an outer leading end of a piston rod 88 of the air cylinder unit 87 by means of a holder 89, and on a lower end of which the cutter wheel 4 is rotatably mounted by means of a cutter block 90.

The electro-pneumatic regulators 81 and 83 and the ordinary regulator 85, which are respectively connected to the control unit 7, impart predetermined air pressure based on signals from the control unit 7 to the valve units 82, 84, and 86. The electro-pneumatic regulators 81 and 83 and the ordinary regulator 85 are connected to the air cylinder unit 87 through the NO type 3-port valve units 82, 84, and 86, respectively. It should be noted that the electro-pneumatic regulators 81 and 83 and the regulator 85 are respectively connected to a compressor, and the electro-pneumatic regulators 81 and 83 and the regulator 85 respectively impart air pressure from the compressor (not shown) to the valve units 82, 84, and 86 after adjusting the air pressure to predetermined air pressure levels on the basis of signals from the control unit 7 in the case of the electro-pneumatic regulators 81 and 83 and manually in the case of the regulator 85. The electro-pneumatic regulator 81 imparts weak pressure to the valve unit 82, while the electro-pneumatic regulator 83 imparts to the valve unit 84 strong pressure which is higher than the air pressure imparted to the valve unit 82. The regulator 85 imparts to the valve unit 86 air pressure required for the air cylinder unit 87 to raise the cutter wheel 4 by means of the holder 89, the rod 65, and the cutter block 90.

In this embodiment, the valve unit 84 is connected to an air chamber 97 in an OFF (non-energized) state, and the valve unit 82 is connected to the air chamber 97 via the valve unit 84 in an ON (energized) state. The valve unit 86 is connected to an air chamber 98 in the OFF state. As the valve units 82, 84, and 86 are operated upon receiving signal voltage from the control unit 7, the valve units 82, 84, and 86 are adapted to effect the imparting and/or cancellation of the imparting of air pressure with respect to the air chamber 97 and/or the air chamber 98.

The holder 89 includes a holder body 101 to which an outer leading end of the piston rod 88 is secured; a bearing 102 mounted on the holder body 101; and a rotator 103 which is rotatably held by the holder body 101 by means of the bearing 102, and to which an upper end of the rod 65 is attached. It should be noted that holes 104 for supplying cutter oil to an abutment portion between the cutter wheel 4 and the glass plate 2 in the formation of a cut line with respect to the glass plate 2 by the cutter wheel 4 are formed in the rotator 103, the rod 65, and the cutter block 90.

The operation of causing the cutter wheel 4 to resiliently press the glass plate 2 with a weak resiliently pressing force in the intensity of the resiliently pressing force of the cutter wheel 4 with respect to the glass plate 2 by means of the resiliently pressing device 6 is as follows. Air pressure from the electro-pneumatic regulator 81 is imparted via the valve unit 82 to the valve unit 84 set in the OFF state by the valve unit 82, and the weak pressure of the electro-pneumatic regulator 81 is imparted to the air chamber 97 of the air cylinder unit 87 via the valve unit 84 in this OFF state (non-energized state). The cutter wheel 4 is pressed against the glass plate 2 with this weak pressure by means of the holder 89, the rod 65, and the like. Meanwhile, strong pressure from the electro-pneumatic regulator 83 is being imparted to the valve unit 84 set in the OFF state, but is shut off by this valve unit 84. Further, air pressure from the regulator 85 for raising the cutter wheel 4 is being imparted to the valve unit 86 set in the OFF state, but is shut off by this valve unit 86 and is not communicated with the air chamber 98 of the air cylinder unit 87. Thus, the cutter wheel 4 presses the glass plate 2 with the weak pressure. It should be noted that the operation of lowering the cutter wheel 4 by the resiliently pressing device 6 during an initial period to cause the cutter wheel 4 to abut against the glass plate 2 is also similar to that described above. In addition, the above-described weak resiliently pressing force is a pressing force which corresponds to the conventional pressing force at the time of cutting a straight line portion (forming a cut line).

The operation of causing the cutter wheel 4 to resiliently press the glass plate 2 with a strong resiliently pressing force in the intensity of the resiliently pressing force of the cutter wheel 4 with respect to the glass plate 2 by means of the resiliently pressing device 6 is as follows. With the valve unit 82 set in the ON state as it is, the state of the valve unit 84 changes to the ON state, and the weak pressure from the valve unit 82 is shut off by this valve unit 84. Alternatively, strong pressure from the electro-pneumatic regulator 83 is passed through this valve unit 84 and is imparted to the air chamber 97 of the air cylinder unit 87, and the cutter wheel 4 is pressed against the glass plate 2 with a strong resiliently pressing force. At this time as well, the valve unit 86, of course, remains in the OFF state, and the air pressure from the regulator 85 is stopped and is not communicated with the air chamber 98 of the air cylinder unit 87. It should be noted that the above-described strong resiliently pressing force is a pressing force which corresponds to the conventional pressing force at the time of cutting a small round portion.

The changeover of the intensity of the resiliently pressing force during cutting is effected by the changeover of ON and OFF of the valve unit 84. Of course, the changeover of ON and OFF of the valve unit 84 is effected by a signal voltage with a fixed time interval (30 ms to 70 ms) by the control unit 7. The valve unit 84 is returned to the OFF state, and a strong pressure circuit communicating from the electro-pneumatic regulator 83 to the air cylinder unit 87 is closed within this valve unit 84. Alternatively, the air chamber 97 of the air cylinder unit 87 is communicated with the valve unit 82 through this valve unit 84, this valve unit 82 is set in the OFF state, and the air of the air chamber 97 of the air cylinder unit 87 is exhausted to the atmosphere. At the same time, the weak pressure from the electro-pneumatic regulator 81 is shut off by this valve unit 82. At the same time, the valve unit 86 is made an ON unit, and the air pressure for raising the cylinder from the regulator 85 is opened within this valve unit 86 and is imparted to the air chamber 98 of the air cylinder unit 87. Then, the cutter wheel 4 is raised by the air pressure from this regulator 85 by means of the holder 89 and the rod 65 and is moved away from the glass plate 2.

The control unit 7 is embodied by a computer 112 wherein, as an operation panel 111 is operated, various settings are provided concerning the cut line 3a, the changeover of the intensity of the resiliently pressing force by the resiliently pressing device 6, the movement of the cutter wheel 4 by the moving means 5, and the like, and on the basis of such settings the computer 112 imparts electrical signals concerning control to the resiliently pressing device 6 and the moving means 5. The control unit 7 may be adapted to provide CNC control for the resiliently pressing device 6 and the moving means 5. Such a control unit 7 is adapted to control the above-described and below-described operation.

Hereafter, a detailed description will be given of the operation concerning the formation of the cut line 3 with respect to the glass plate 2 by the glass cutting machine 1 in accordance with this embodiment. First, the glass plate 2 where the cut line 3 is to be formed is placed on the damage prevention sheet 12 to thereby allow that glass plate 2 to be supported by the supporting table 8. Next, the cutter wheel 4 is moved by the X-Y direction moving device 21 in the X-Y coordinate plane to above a preset cut-line forming start position with respect to the glass plate 2 supported on the supporting table 8, and the cutter wheel 4 is oriented in the cut-line forming direction by the rotating device (angle controlling device) 22. By imparting air pressure from the electro-pneumatic regulator 81 to the air chamber 97, a weak resiliently pressing force (for cutting a straight line) directed downward toward the glass plate 2 is imparted to the cutter wheel 4, which has been moved to above the cut-line formation start position and has been oriented in the cut-line forming direction, by the resiliently pressing device 6. The cutter wheel 4 is thus lowered in the Z direction and is abutted against an upper surface 2a of the glass plate 2 to resiliently press the glass plate 2 with that resiliently pressing force. It should be noted that the cut-line formation start position is set to be a straight line portion 15 among the preset cut lines 3a to be formed on the glass plate 2.

As shown in the part (a) of FIG. 5, the cutter wheel 4 which resiliently presses the glass plate 2 at the cut-line formation start position is moved in the X-Y coordinate plane by the X-Y direction moving device 21 and is moved along the straight line portion 15. The cutter wheel 4 moved as the above is rotated on the glass plate 2. During such movement of the cutter wheel 4, the valve unit 84 repeats "ON" and "OFF" at fixed time intervals, whereby the weak pressure of the electro-pneumatic regulator 81 and the strong pressure of the electro-pneumatic regulator 83 are alternately imparted to the air chamber 97 of the air cylinder unit 87 serving as the resiliently pressing device 6 to press the cutter wheel 4 while being alternately changed over as the intensity of the resiliently pressing force. The fixed time interval for changing over the intensity of the resiliently pressing force by the resiliently pressing device 6 may be set in the range of from 30 ms to 70 ms, and may be 50 ms, for example. As described above, the cutter wheel 4 forms the cut line 3 while propagating the fissure deeply and finely in the glass plate 2 along the straight line 15 by pulsatingly pressing the glass plate 2 by the moving means 5 and the resiliently pressing device 6.

In a case where the cut line 3 is formed on the glass plate 2 along a round portion 16 among the cut lines 3a by the cutter wheel 4, the cutter wheel 4 is moved along the round portion 16 while being moved and rotated in the X-Y coordinate plane by the X-Y direction moving device 21 and the rotating device 22, as shown in the part (b) of FIG. 5. Additionally, the cutter wheel 4 is resiliently pressed while the intensity of the resiliently pressing force is alternately being changed over intermittently at fixed time intervals by the resiliently pressing device 6. Here, the moving velocity at the time when the cutter wheel 4 is moved along the round portion 16 of a corner portion 17 of the glass plate 2 by the X-Y direction moving device 21 is slower than the moving velocity at the time when the cutter wheel 4 is moved along the straight line portion 15 by the X-Y direction moving device 21. For this reason, at the round portion, the changeover of the intensity of the pressing force becomes more frequent relative to the moving distance of the cutter wheel 4, and the cut line is formed in a state in which the rate of strong pressing force is increased. For this reason, the fissure at the round portion can be formed more deeply and finely. If the glass plate 2 with the cut line 3 formed thereon is bend-broken along the cut line 3, its bend-broken surface is a fine surface devoid of chipping.

According to the glass plate cutting machine 1 in accordance with this embodiment, the glass plate cutting machine 1 in accordance with this embodiment is comprised of the cutter wheel 4 for forming the cut line 3 on the glass plate 2; the moving means 5 for moving the cutter wheel 4 along the cut line 3a which has been preset and is to be formed on the glass plate 2; the resiliently pressing device 6 for resiliently pressing the cutter wheel 4 against the glass plate 2; and the control unit 7 for controlling the resiliently pressing device 6 so as to alternately change over the intensity of the resiliently pressing force of that cutter wheel 4 with respect to the glass plate 2 in the movement of the cutter wheel 4 by the moving means 5. Therefore, the cut line 3 where the fissure has propagated more deeply, uniformly, and finely can be formed on the glass plate 2.

The invention claimed is:

1. A glass plate cutting machine comprising: a cutter blade for forming a cut line on the glass plate; a moving device to move said cutter blade along the cut line which has been preset and is to be formed on the glass plate, a resilient pressing device to press said cutter blade against the glass plate by resilient pressing force caused by air pressure, and a control unit to control the resilient pressing device so as to alternately change over the intensity of the resilient pressing force of said cutter blade with respect to the glass plate in a movement of the cutter blade by the moving device for forming the cut line, said resilient pressing device including an air cylinder unit to press the cutter blade against the glass plate by the resilient pressing force caused by the air pressure supplied thereto, first air pressure source for generating first air pressure, second air pressure source for generating second air pressure which is higher than the first air pressure, and a valve mechanism to communicate the air cylinder unit alternately to the first and second air pressure sources, a control unit being adapted to control the valve mechanism so as to supply the first and second air pressure alternately to the air cylinder unit in a case of alternative changeover of the intensity of the resilient pressing force of the cutter blade with respect to the glass plate in the movement of the cutter blade by the moving device for forming the cut line.

2. The glass plate cutting machine according to claim 1, wherein said control unit is adapted to control the resilient pressing device so as to alternately change over the intensity of the resilient pressing force caused by the air pressure imparted to the air cylinder unit of said cutter blade with respect to the glass plate at a fixed time interval in the movement of said cutter blade.

3. The glass plate cutting machine according to claim 1, wherein said control unit is adapted to control said resilient pressing device so as to alternately change over the intensity of the resilient pressing force caused by the air pressure imparted to the air cylinder unit of the cutter blade with respect to the glass plate at a time interval of from 30 ms to 70 ms.

4. A glass plate cutting machine comprising: a cutter blade for forming a cut line on the glass plate, a moving device to move said cutter blade along the cut line which has been preset and is to be formed on the glass plate, a resilient pressing device to press said cutter blade against the glass plate by resilient pressing force caused by air pressure; and a control unit to control the resilient pressing device so as to alternately change over the intensity of the resilient pressing force of said cutter blade with respect to the glass plate in a movement of the cutter blade by the moving device for forming the cut line, said resilient pressing device including first air pressure source for generating first air pressure, second air pressure source for generating second air pressure which is higher than the first air pressure, third air pressure source for generating third air pressure, first switchable valve unit communicated to the first air pressure source, second switchable valve unit communicated to the first valve unit and the second air pressure source, third switchable valve unit communicated to the third air pressure source, and an air cylinder unit communicated to the second and third valve units, said control unit being adapted to control the first to third valve units so that the first to third valve units are switched so as to supply the first air pressure to the air cylinder unit and inhibit supply of the third air pressure to the air cylinder unit in a case where the cutter blade not pressing the glass plate is descended so as to press the glass plate, that the second valve unit is alternately switched so as to supply the first and second air pressure alternately to the air cylinder unit in a case of alternative changeover of the intensity of the resilient pressing force of the cutter blade with respect to the glass plate in the movement of the cutter blade by the moving device for forming the cut line, and that the first to third valve units are switched so as to supply the third air pressure to the air cylinder unit and inhibit supply of the first and second air pressure to the air cylinder unit in a case where the cutter blade is raised apart from the glass plate.

* * * * *